United States Patent [19]

Narbaits-Jaureguy et al.

[11] 3,964,063

[45] June 15, 1976

[54] TRAFFIC-SURVEILLANCE SYSTEM

[75] Inventors: Jean-Raymond Narbaits-Jaureguy; Henri Billottet, both of Paris, France

[73] Assignee: Thomson-CSF, Paris, France

[22] Filed: July 2, 1973

[21] Appl. No.: 375,444

[30] Foreign Application Priority Data

July 6, 1972 France .............................. 72.24465

[52] U.S. Cl. .......................... 343/5 PD; 340/258 B; 343/767

[51] Int. Cl.[2] .......................................... G01S 9/00

[58] Field of Search .................. 343/5 PD, 7.7, 762; 340/258 B

[56] References Cited

UNITED STATES PATENTS

| | | | |
|---|---|---|---|
| 2,648,839 | 8/1953 | Ford et al. | 340/258 B UX |
| 2,649,538 | 8/1953 | Marlow et al. | 343/5 PD |
| 3,031,643 | 4/1962 | Sheftelman | 340/258 B |
| 3,286,260 | 11/1966 | Howard | 343/100 SA |
| 3,679,993 | 10/1972 | Jones et al. | 343/7.7 |

OTHER PUBLICATIONS

M. I. Skolnik, *Radar Handbook*, McGraw-Hill, 1970, pp. 8-1 to 8-13.

M. I. Skolnik, *Introduction to Radar Systems*, McGraw-Hill, 1962, p. 314.

*Primary Examiner*—Maynard R. Wilbur
*Assistant Examiner*—G. E. Montone
*Attorney, Agent, or Firm*—Karl F. Ross; Herbert Dubno

[57] ABSTRACT

A traffic-surveillance system comprises a radar equipment coupled to a transmitter/receiver antenna. This antenna is formed by a transmission line including an elongate hollow conductor with leakage losses, such as a slotted coaxial cable or waveguide, producing along its length an electric radiating field. Any metallic mass, such as a vehicle, located within that field reflects part of the radiated energy which is then picked up by the line. Part of the reflected energy is absorbed in the characteristic impedance of the line while the remainder is conveyed to the radar equipment where it is processed to yield the required information concerning the vehicle.

7 Claims, 7 Drawing Figures

TRAFFIC-SURVEILLANCE SYSTEM

BACKGROUND OF THE INVENTION

The present invention relates to a system for the surveillance of traffic, more particularly road traffic.

The considerable increase in car parks, which it is impossible to follow up with an appropriate increase in access routes, means that traffic density in the streets of towns, and on main roads and even freeways, increases to enormous proportions at certain hours of the day or on certain days.

It is useful for the authorities whose job it is to ensure a satisfactory flow of motor traffic to receive information on traffic conditions, so that it is possible for them to put into operation diversions onto routes which are less heavily used than those normally taken by motorists.

It is therefore important that information be available at all times for a certain section of main road or by-road concerning the number of vehicles in that section, their speed, the distance between them, and their size, this information enabling the state of traffic on the section in question to be known.

This information, or certain aspects of it, is conventionally obtained by means of known devices.

It is known to use counters which, at the point at which they are installed, record the passage of vehicles and thus give an indication of the number of vehicles passing this point.

Television cameras have also been set up on highway sections to be kept under surveillance which enable the situation to be seen on an associated receiver.

In this case, however, insufficient information is obtained regarding the distance between vehicles, their speed, etc.

Radars, generally Doppler radars, have also been set up which enable information to be obtained at the point at which they are positioned concerning the speed of vehicles which enter their operating area, the distance separating them and their position.

Nevertheless, under the conditions in which they were used and considering the way in which they were installed, it proved difficult, if not impossible, to cover a relatively long section of road with radars and to extract useful information from them.

The present invention is intended to overcome the drawbacks which have been pointed out and in particular those encountered with radars.

According to the invention, there is provided a system for the surveillance of traffic within a zone which covers a certain length of a route traversed by vehicles concerning which it is desired to gather information, this information relating, inter alia, to their number, size, position, speed and relative spacing. This information is supplied by radar equipment operating in the surveyed area, this equipment being connected to a transmitter/receiver antenna formed by a transmission line which is subject to leakage along its whole length, the line extending substantially over the full length of the zone to be covered.

A system of this type clearly avoids the disadvantages pointed out for prior-art systems, and enables all sorts of information of a radar nature to be obtained for any vehicle situated in the effective area of the radar employed, this effective area being determined by the way in which the leak line, which is used as an antenna, is installed and by its length.

BRIEF DESCRIPTION OF THE DRAWING.

The invention will be better understood from the following description of some ways it may be carried into effect, reference being made to the accompanying drawing in which.

SPECIFIC DESCRIPTION.

The problems posed by the rapid increase in car parks are becoming more and more serious and traffic flow under conditions which are not too far removed from the normal is becoming a matter of more and more critical balance.

To try to improve this situation, the urgency of which is increasing from day to day, many solutions have been proposed and are to be put into practice. All, or practically all, rely basically on the collection of information relating to vehicles which, at a given moment, are in a certain position. This information is, for example, the number of vehicles situated at a given moment at a particular point, or on a section of main road or by-road whose location in a group of access roads is such that it enables diversionary routes to be set up. The information may also include, for a given section of road, the speed of the vehicles and their spacing, that is to say the distance separating them; there may also be data on the size of the vehicles and on their position.

It is clear that all this information may be provided by conventional equipment, namely radar, already used in certain instances in surveillance systems for motor traffic. However, depending on their type, these radars give information on the number of vehicles passing a specific point, on the speed of these vehicles at this point and also on their position, but only within a relatively limited area around the point in question. Furthermore, the information collected for vehicles going in one direction is interfered with by that coming from vehicles proceeding in the opposite direction.

In our improved system, designed to provide the requisite information relating specifically to vehicles passing through an area or section of thoroughfare which may be relatively large, a radar antenna of the aforementioned leakage type serves.

To define an extended radiation zone for the radar in which all the information mentioned, which may relate to a large number of vehicles situated in this zone, may be collected and selectively, attributed to different vehicles without intermixing or interference.

It is difficult to use a conventional radar in this instance, since that would require too great a discriminating capacity and would provide too cumbersome a solution for the problem to be dealt with.

The leak or loss line coupled to a conventional radar station, pursuant to our invention, creates a field of electrical radiation around it and along its whole length. The vehicles situated within the field of radiation of this antenna reflect part of the energy which reaches them and this energy is picked up by the line and returned to the radar receiver where it is processed in the appropriate way.

Figure 1:
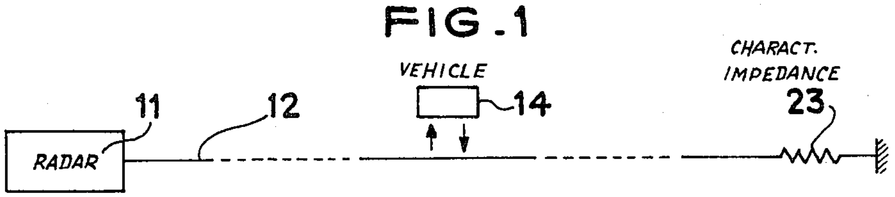
FIG. 1 is a diagram of a surveillance system embodying our invention.

FIG. 1 shows, in a very schematic way, how the system for traffic surveillance is laid out over a predetermined zone.

Reference numeral 11 indicates the radar equipment employed, which is coupled to a leak line 12 which performs the functions of an antenna under the conditions detailed above. This leak line terminates in its characteristic impedance 23. At 14 is shown a vehicle on the section of road along which the system has been installed. It can be seen that line 12 is of a certain length which corresponds to the length of the section which it is desired to monitor. As regards the operation of this system, the transmitter of the radar equipment 11 transmits a certain amount of energy along line 12 in the form of repeated pulses, the pulses being absorbed by the load 23 matching its characteristic impedance. This line 12 is a so-called leak line in which each pulse creates a field of radiation around the line as it is propagated along the line.

The mass of a vehicle 14, or any other metallic mass situated in the vicinity of the line (that is to say within the field of radiation of the antenna formed thereby), is capable of receiving part of the radiated energy, which it then reflects. Part of this energy is received by line 12 which propagates it on the one hand to the load 23 and on the other hand to radar 11, where the receiver will process it so as to extract from it the desired information.

The power of the emission is obviously so calculated that the energy reflected by a vehicle situated at the end of the zone in question, i.e., on the same side as the load 23, is still adequate for the input stages of the radar receiver to be able to detect it, bearing in mind the attenuation due to two-way coupling and reflection losses between the line and the vehicle.

In the same way, the length of the pulses emitted by the transmitter, their rise time, and the passband of the system are selected as a function of the detection criteria applied to the radar and also as a function of the accuracy required for the information. Pulse lengths of the order of 0.1 microsecond, and a passband of the order of 30 Mc/s may be considered, to give an accuracy of the order of 2m in determining the position of a vehicle. As for the operating area, it may be from one to two kilometers long.

Figure 2:
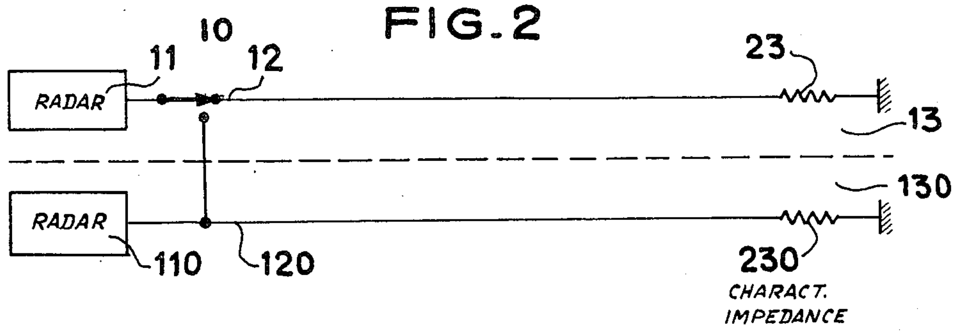
FIG. 2 is a diagram of such a surveillance system designed for two parallel lanes of traffic.

FIG. 2 shows an installation on a two-lane highway, also in schematic form. A radar station 11 associated with a line 12 operates in one of the lanes 13 of the highway, a radar station 110 associated with another line 120 operates in the other lane 130.

To avoid lateral radiation from the lines, which may be troublesome, arrangements may be made for the two radars not to operate simultaneously. To this end, one of the radars may then be dispensed with and the lines may be switched to the remaining radar equipment so that they operate alternately. If the highway has more than two lanes, the transmissions lines belonging to each lane may likewise be switched to a single radar equipment in a predetermined operating sequence. Such a switch, indicated diagrammatically at 10, is known per se and may be operated according to conventional techniques.

According to a more specific feature of our invention, the transmission line serving as a transmit/receive antenna for the associated radar installation comprises an elongate hollow conductor provided with a longitudinally extending slot to facilitate the generation of a radiating field therearound. Advantageously, the slot diverges from its end proximal to the radar installation 11 to its other, remote end connected to the dissipative load 23. As a result of this divergence, the leakage losses of the line progressively increase with increasing distance from the radar transmitter and receiver. This makes it possible to have a substantially uniform field of radiated energy along the whole length of the line, taking into account the propagation losses along the line. There also occurs a progressive increase in the coupling between the line and the moving object as the latter approaches the end of the line so that the signal returning to the receiver is of a constant level whatever the position of that moving object along the line.

Figure 3:
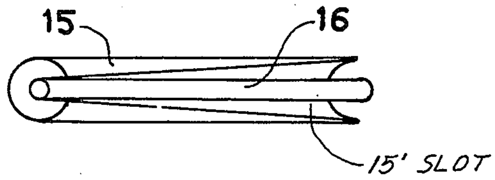
FIG. 3 is a schematic view of a slotted coaxial cable.

FIG. 3 is a view of a coaxial cable with a tubular outer conductor 15 and an inner conductor 16 used as a leak line and thus as an antenna for the radar equipment, conductor 15 being provided with a slot 15' diverging toward the load 23 of FIG. 1.

Figure 4:
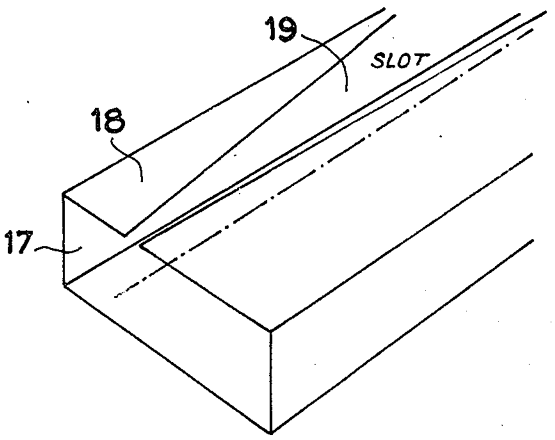
FIG. 4 is a schematic view of a slotted wave guide.

The leak line may also be a waveguide 17, FIG. 4, a slot 19 along one of its faces 18 conforming to the characteristics described above. The slot shown is offset from the longitudinal centerline of the face 18 which is advantageous for certain modes of excitation of the waveguide.

The radar equipment associated with a leak line such as those described in the foregoing may be of various types depending on the information which is desired to obtain.

Figure 5:
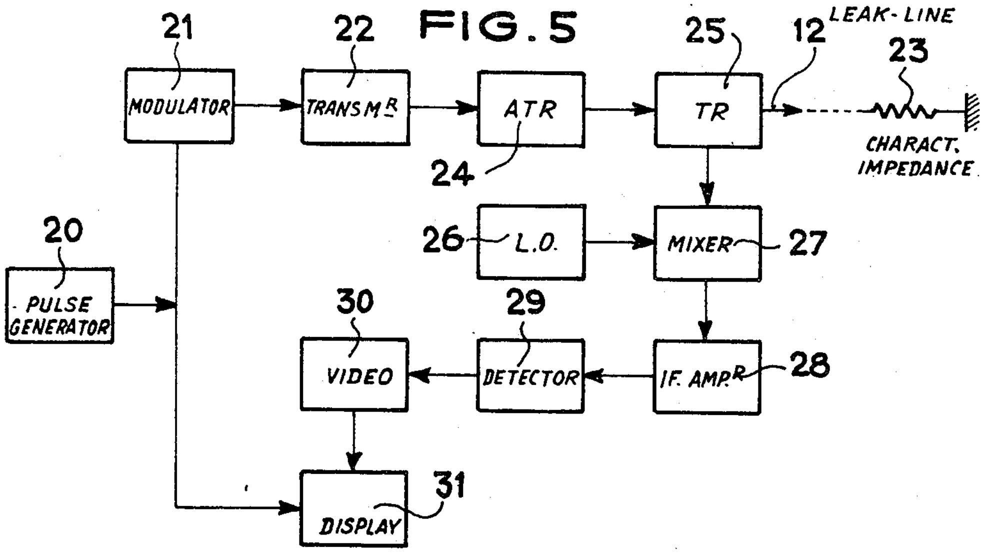
FIGS. 5, 6 and 7 are diagrams of radar equipments usable in a system according to the invention.

FIG. 5 shows, schematically, a known type of radar adapted to be used with such a leak line.

A pulse generator 20 supplies pulses of which both the length and the repetition rate are precisely fixed, and which feed on the one hand a modulator circuit 21 and on the other hand a display 31. The modulator 21 is connected to a transmitter stage in the form of a magnetron 22 which supplies the antenna 12 via an ATR device 24 and a TR device 25 of conventional type, the antenna 12 being again a leak line which terminates in its characteristic impedance 23. On reception, the return pulses are fed through TR device 25 to a mixer 27 connected to a local oscillator 26. The mixer feeds an intermediate-frequency amplifier 28 connected to a detector 29 which supplies a video frequency stage 30 connected to the display 31.

The operation of such a radar is assumed to be known. However, in the context of the present invention, certain aspects may be specifically pointed out.

It may be mentioned that the pulses transmitted by the radar and those received after reflection from a moving object are propagated in two different media, namely air, in which the speed of propagation of the energy is $3.10^8$ m/sec, and the line, where this speed is of the order of 0.5 to 0.6 times that in air.

The travel in air is, however, relatively short, taking place only from the line to the vehicle and then from the vehicle to the line at the point of coupling between line 12 and vehicle 14 (FIG. 1); its path length depends on the height of the vehicle, which varies relatively little from vehicle to vehicle. In working out the required data, it will be possible to ignore the speed of propagation in air and to take into account only that in the line.

The radar equipment enables the position of a vehicle to be obtained, this position being given by the formula $(dT/2) \times Vp$, in which $dT$ represents the interval between the emission of a pulse and the leading edge of the reflected pulse, and *Vp* represents the speed of propagation of the pulses in the line.

The size of a vehicle is given by the length of the reflected pulse, similarly multiplied by the speed of propagation of the pulse in the line.

The distance between two vehicles is given by the interval between the trailing edge of one and the leading edge of the other of the pulses reflected by the two vehicles in question, multiplied by the speed of propagation in the line.

All these results are displayed on a cathode-ray tube in unit 31.

With a radar of this type it is also possible to evaluate the speed of each vehicle by measuring the variation in time dT from one pulse cycle to the next.

A radar of the Doppler type may also be used which enables the Doppler frequency to be measured for each vehicle.

Figure 6:
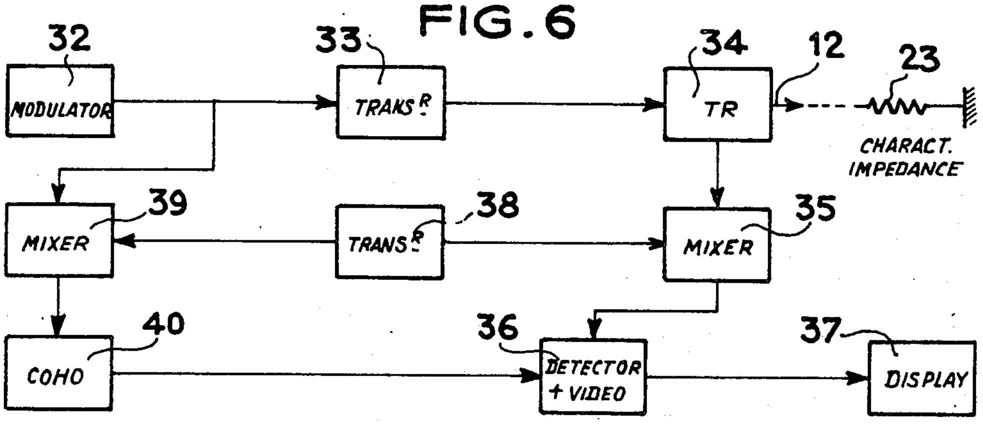

FIG. 6 shows another type of radar including a modulator 32 feeding a transmitter 33 which is connected via a TR circuit 34 to the line 12 and its load 23 matching the characteristic line impedance. On the receiver side, the incoming pulses are applied via a TR circuit 34 to a mixer 35 which receives a local oscillation from an oscillator 38. Mixer 35 is connected to a device 36 which comprises a detector and the video stages supplying a display device 37. The modulator 32 is further connected to a mixer 39 which is supplied by local oscillator 38, this mixer being connected to a coherent oscillator 40 working into receiver 36.

Figure 7:
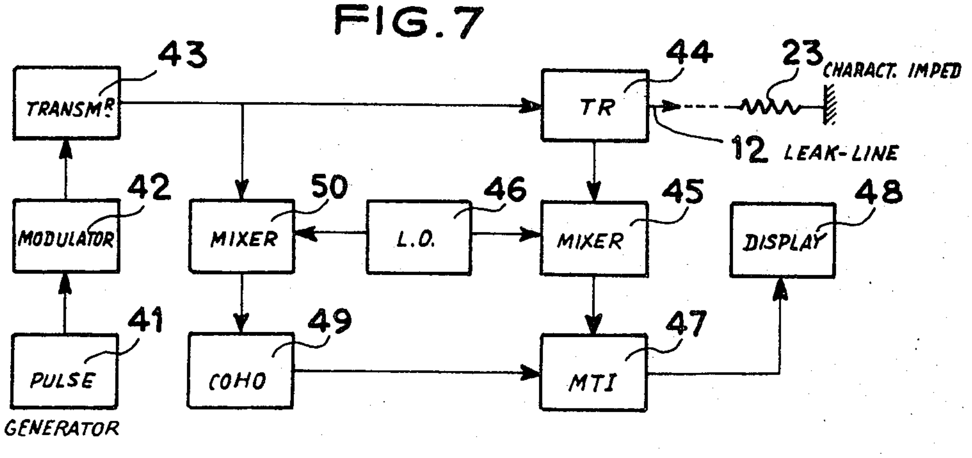

A device for eliminating fixed echoes may also be included in a system according to the present invention. FIG. 7 shows such a device.

A pulse generator 41 is connected to a modulator 42 feeding a transmitter 43 which, via a TR device 44, supplies the leak line 12 which again performs the function of an antenna. The TR device 44 switches the reflected pulses delivered by the antenna to a mixer 45 connected to a local oscillator 46, this mixer being connected to a device 47 for detecting and suppressing fixed echoes, known as a moving-target indicator (MTI), which is connected to a display device 48. Device 47 is controlled by an intermediate-frequency coherent oscillator 49, which is triggered by a mixer 50 connected to transmitter 43.

These examples demonstrate that any existing type of radar may be used to obtain the information required in the context of the present invention.

What is claimed is:

1. A system for the surveillance of traffic along a route traversed by a succession of vehicles to be monitored comprising:

a radar installation provided with a source of high-frequency signals, transmission means connected to said source for emitting said signals, reception means for signals reflected by extraneous objects, and indicator means for reflect signals connected to said reception means;

antenna means including a hollow elongate conductor extending along said route for radiating said signals and picking up reflections thereof from passing vehicles, said conductor being connected at one end to said transmission and reception means; and a load connected to the other end of said conductor, said load having an impedance matching the characteristic impedance of said antenna means, said conductor having a longitudinally extending slot diverging from said one end to said other end at a rate providing a substantially uniform radiating field along said route.

2. A system as defined in claim 1 wherein said hollow conductor is part of a coaxial cable.

3. A system as defined in claim 1 wherein said hollow conductor is a waveguide.

4. A system as defined in claim 1 wherein said route comprises a plurality of parallel lanes, said transmission line being one of a plurality of transmission lines respectively extending along said lanes, each transmission line being connected to an individual radar installation.

5. A system as defined in claim 4, further comprising switch means for individually connecting said transmission lines at different times to said radar installation.

6. A system as defined in claim 1 wherein said radar installation is provided with motion-detecting means connected to said reception means.

7. A system as defined in claim 6 wherein said motion-detecting means comprises a moving-target indicator.

* * * * *